United States Patent [19]

Sharpe et al.

[11] Patent Number: 5,228,337
[45] Date of Patent: Jul. 20, 1993

[54] TIRE PRESSURE AND TEMPERATURE MEASUREMENT SYSTEM

[75] Inventors: Brian A. J. Sharpe, Ryde; Michael G. Blee, Newport, both of England

[73] Assignee: Westland Aerostructures, Ltd., United Kingdom

[21] Appl. No.: 815,754

[22] Filed: Jan. 2, 1992

[30] Foreign Application Priority Data

Jan. 12, 1991 [GB] United Kingdom ............... 9100720

[51] Int. Cl.⁵ .............................................. B60C 23/02
[52] U.S. Cl. .................................... 73/146.5; 73/708;
340/445; 364/571.01; 374/143
[58] Field of Search ................... 73/146.5, 146.2, 708,
73/146.8, 4 R; 340/442, 445, 448; 364/571.01;
374/143

[56] References Cited

U.S. PATENT DOCUMENTS

| | | | |
|---|---|---|---|
| 4,506,328 | 3/1985 | Bateman | 340/443 |
| 4,703,650 | 11/1987 | Dosjoub et al. | 73/146.5 |
| 4,845,649 | 7/1989 | Eckardt et al. | 364/571.02 |
| 4,891,973 | 1/1990 | Bollweber et al. | 73/146.5 |
| 4,909,074 | 3/1990 | Gerresheim et al. | 73/146.5 |
| 5,140,851 | 8/1992 | Hettich et al. | 73/146.5 |

FOREIGN PATENT DOCUMENTS 2122757A 1/1984 United Kingdom .

Primary Examiner—Donald O. Woodiel
Attorney, Agent, or Firm—Larson & Taylor

[57] ABSTRACT

Vehicle wheel tire inflation pressure, e.g. an aircraft undercarriage wheel tire, is measured in real time by a sensor assembly mounted on a rotary part of the wheel. The assembly includes a piezoresistive cell exposed to inflation gas pressure and an electronics module comprising an assembly of three printed circuit boards (PCB). A power signal transmitted from the vehicle to the electronics module via a rotary transformer is conditioned by PCB to provide an energising signal for the cell. Pressure and temperature signals output by the cell are received by the PCB and converted to digital form before being applied to address locations in a look-up table of PCB which holds pre-calibrated cell outputs. Data from the look-up table is processed to obtain a corrected real time pressure value which is transmitted to the vehicle. If desired, a temperature value may also be transmitted.

19 Claims, 5 Drawing Sheets

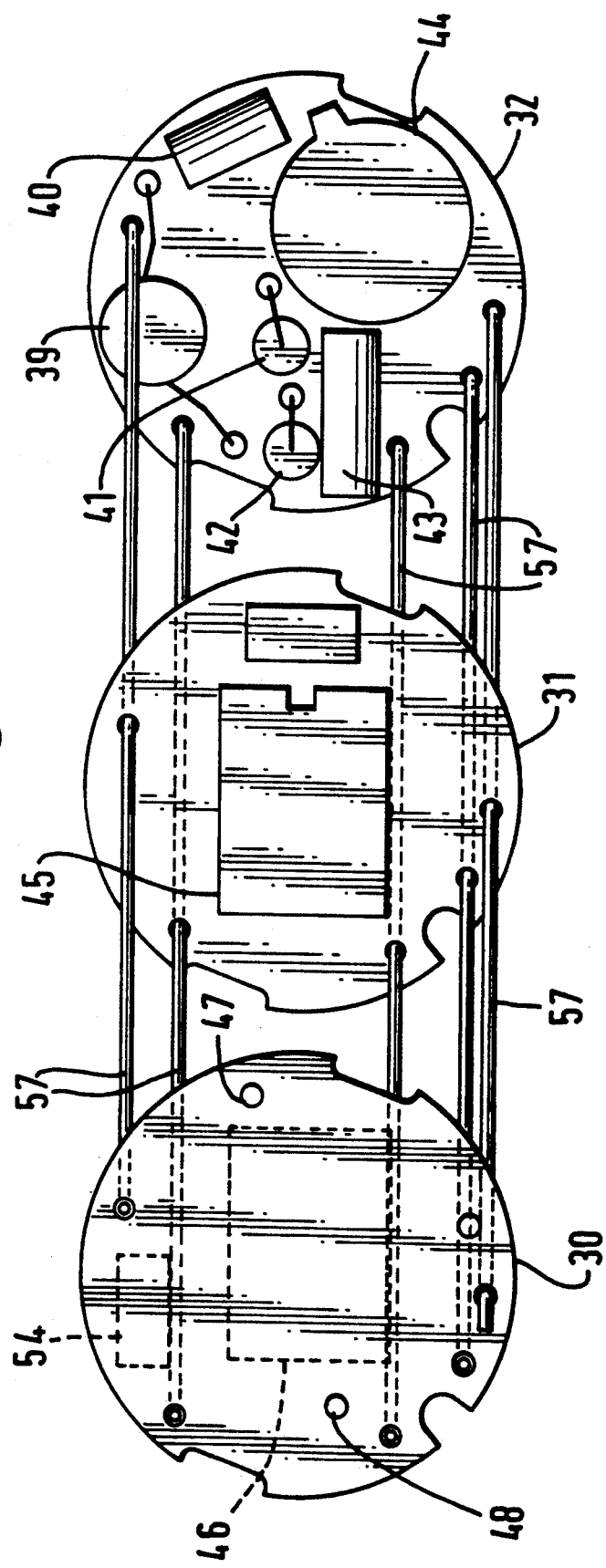

TIRE PRESSURE AND TEMPERATURE MEASUREMENT SYSTEM

BACKGROUND OF THE INVENTION

1. Field of the Invention

This invention relates to a system for measuring the inflation pressure of a tire on a vehicle wheel and subsequently transmitting measured real time pressure values to the vehicle, which system may also be used to transmit measured temperature values to the vehicle.

2. Description of the Prior Art

It is an increasing requirement in modern day passenger carrying aircraft that the pressure of each tire on the aircraft undercarriage be monitored continuously during taxiing, takeoff, flight and landing.

The operating temperature range, typically −55° C. to +160° C., the accuracy, typically ±2% of reading, and size constraints required of some systems are such that they cannot be met by a system using an uncompensated sensor. Such uncompensated sensors have the disadvantage that their output is non-linear and varies with temperature.

U.S. Pat. No. 4,845,649 discloses a sensor unit for measuring inflation pressure of a vehicle tire which includes a pressure sensor, an analogue to digital converter, a logic circuit and a programmable read only memory (PROM) disposed on a chip which consists of an electrically nonconductive material. Before being installed on a vehicle wheel, the unit is mounted on a test stand for calibration of the pressure sensor and correcting values for linearising sensor outputs are determined and stored in the PROM. A disadvantage of the disclosed arrangement is that in operation, with the sensor unit installed on a vehicle wheel, both pressure sensor measurement values and correction data from the PROM are transmitted to a microprocessor on the vehicle for processing to obtain a corrected pressure signal. This requirement for transmission of two data signals between the wheel and the vehicle introduces two possible sources of error. Furthermore, although this reference proposes that the temperature fluctuations may be taken into account during calibration of the pressure sensor, there is no disclosure of temperature measurement during operation of the sensor unit. Thus, the sensor arrangement disclosed in U.S. Pat. No. 4,845,649 corrects the measured pressure value and outputs a pressure reading that is compensated back to a normal or cold tire state.

SUMMARY OF THE INVENTION

It is an object of the present invention to provide a system for real time measurement of tire inflation pressure which is compensated for the temperature of the sensor over a wide temperature range, which system will measure pressure with a high degree of accuracy and transmit real time pressure values to a vehicle on which the wheel is mounted.

It is another object to provide a system which may also be used for real time measurement of temperature in addition to pressure and which will transmit such measured values from the wheel to the vehicle.

It is a further object of the invention to provide a system which is particularly suited for use in monitoring the inflation pressure of wheel tires on an aircraft undercarriage and for transmitting real time pressure values to the aircraft.

Accordingly, in one aspect the present invention provides a method of measuring vehicle wheel tire inflation pressure in real time comprising the steps of:

exposing a pressure cell to pressure of gas inflating the wheel tire;

transmitting a power signal from the vehicle to the wheel;

conditioning the power signal to obtain a signal suitable for energising the pressure cell;

energising the pressure cell;

obtaining a first signal output by the pressure cell representative of tire inflation pressure acting on the pressure cell;

monitoring the resistance of the pressure cell to obtain a second signal representative of temperature of the pressure cell;

converting the first and second signals to digital signals;

applying the digital signals to address locations in a look-up table holding calibrated pressure cell outputs over a range of pressure and temperature;

processing data from the look-up table to obtain a corrected real time pressure value; and transmitting a signal representative of the corrected real time pressure value to the vehicle.

The step of monitoring the pressure cell resistance to obtain the second signal may comprise measuring the current flow through a high precision resistor connected in series in the input to the pressure cell.

The look-up table preferably holds a number of pressure cell outputs over a range of pressure and temperature where the number of address locations is small compared with the required system resolution.

A preferred method includes the step of converting corrected pressure values to binary coded data for transmission to the vehicle.

Preferably, a pressure value is transmitted repetitively in three binary words, each word comprising a start bit, a number of data bits, a parity bit and a stop bit.

In an embodiment of the invention, four binary words are transmitted, the first three binary words comprising pressure data and, if required, the fourth word comprising temperature data. Each word may comprise a start bit, eight data bits, a parity bit and a stop bit.

In a preferred embodiment, the binary coded data is transmitted by modulating frequency shift key signals onto the power signal.

It is a further object of the present invention to provide a system for real time measurement of vehicle wheel tire inflation pressure, comprising: pressure sensor means adapted for mounting on a rotary part of the vehicle wheel and including a pressure cell means connected with electronic module means; the electronic module means comprising signal conditioning electrical circuit means for conditioning a power signal transmitted to the rotary wheel part and outputting a signal for energising the pressure cell means; an electrically-erasable-programmable-read-only memory (EEPROM) for storing, in the form of a look-up table, values of pressure and temperature signals output by the pressure cell means when calibrated over a range of pressure and temperature; pressure cell signal output processing electrical circuit means connected for receiving first signals representative of inflation pressure sensed by the pressure cell and second signals representative of temperature of the pressure cell; the processing electrical circuit means including means for converting the first and second signals to digital form; means for addressing locations in the EEPROM look-up table; means for processing data from the look-up table to obtain a corrected pressure value; and means for converting the corrected pressure value to binary data for transmission to the vehicle.

The pressure cell means preferably comprises a piezoresistive element; but other cells such as, for example, one comprising a resistive element on a stainless steel or ceramic diaphragm, may also be found suitable.

Means for transmitting a power signal onto the rotary wheel part may comprise rotary transformer means having a primary coil mounted on a fixed part of the vehicle and a secondary coil mounted on the rotatary wheel part.

The electronic module means may be provided by three electrically connected printed circuit boards (PCB) comprising a power supply PCB including connection means for receiving the power signal, an EEPROM PCB, and a pressure cell signal output processing PCB including means for connection to the pressure cell means.

The power supply PCB preferably comprises power signal rectification means and voltage regulator means for converting a rectified power signal to a voltage reference signal which is used to energise the pressure cell means and to power the EEPROM PCB and the pressure cell signal output processing PCB.

The pressure cell signal output processing PCB preferably mounts an application specific integrated circuit (ASIC).

The ASIC reads pressure and temperature voltage signal values for a plurality of samples. These values are converted from analog to digital format by an analog to digital converter incorporated in the ASIC.

The ASIC further includes averaging logic means which is fed by the analog to digital converter means to output EEPROM addresses for both pressure and temperature.

Data acquired from the EEPROM is processed by interpolation logic means incorporated in the ASIC to calculate a corrected pressure value.

A signal representative of the corrected pressure value, and if desired, the temperature value, is passed to digital synthesiser means incorporated in the ASIC. The pressure and temperature data is coded into binary form, and converted to frequency-shift key (FSK) signals which are modulated onto the power signal for transmission to the vehicle by way of the rotary transformer means.

The FSK signals are received and decoded by computer means on the vehicle and made available to an aircraft data bus for display if required.

Preferably the ASIC incorporates built in tests (BITE) which check the inputs of the pressure cell means are not short circuited to the energising voltage, low impedance to 0 volts, and open circuit. The BITE may also test the EEPROM PCB and the ASIC PCB and if an error is detected this may be reported by an error code.

The present invention distinguishes over the disclosures of U.S. Pat. No. 4,845,649 by correcting pressure signals on the wheel before transmission to the vehicle. Also, in operation, a system in accordance with the present invention monitors the temperature of the sensor and outputs real time pressure values compensated for the temperature of the sensor which further distinguishes the present invention from U.S. Pat. No. 4,845,649.

BRIEF DESCRIPTION OF THE DRAWINGS

The invention will now be further described by way of example and with reference to the accompanying drawings of which:

FIG. 4 is an exploded schematic view illustrating the positions of three printed circuit boards of the electronics module shown in FIG. 3;

DETAILED DESCRIPTION OF THE DRAWINGS

A tire pressure indication system for an aircraft described below allows the pressure of each tire on an undercarriage of the aircraft to be monitored continuously while the aircraft power system is switched on and, in particular, during taxiing, takeoff, flight and landing.

Figure 1:
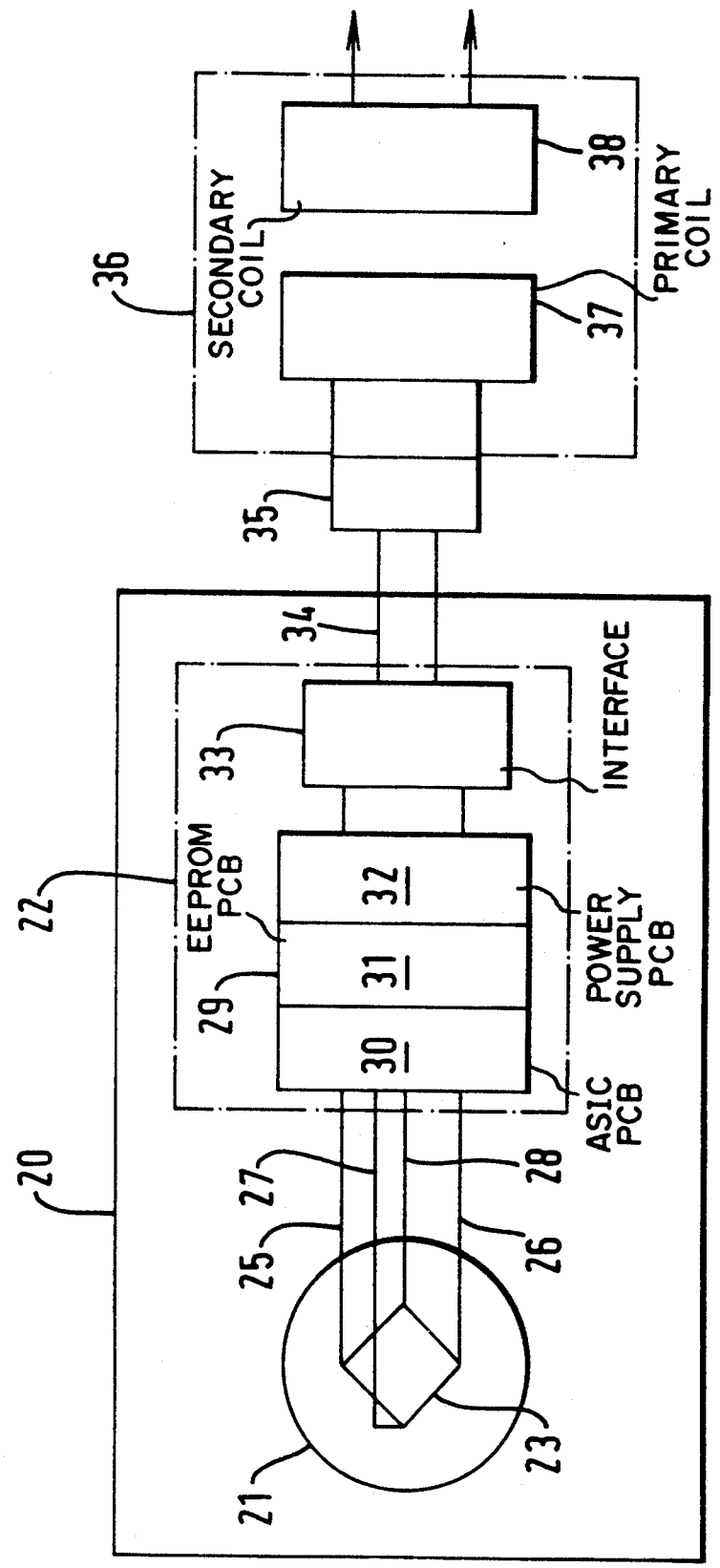
FIG. 1 is a schematic block diagram of a system in accordance with one embodiment of the present invention.

Referring to FIG. 1, the system comprises for each wheel of the undercarriage (not shown) a pressure sensor 20 which is attached to the wheel by means of a pressure sensor holder (not shown) which may consist of a stainless steel tubular shell. In this embodiment, the pressure sensor 20 comprises a piezoresistive pressure cell 21 connected to an electronics module 22. The pressure cell 21 is a monolithic device in the form of a silicon wafer having a wheatstone bridge circuit 23 implanted thereon, such as is sold by KELLER AG of 119 St. Gallerstrasse, Winterthur, Switzerland. The bridge 23 is energised by a voltage reference signal supplied from the electronics module 22 over lines 25 and 26. The pressure cell 21 is exposed to pressure of nitrogen gas inflating a tire (not shown) on the wheel in which the sensor 20 is housed. The pressure cell is deformed by the nitrogen gas pressure, and the bridge 23, which may be in balance at a pressure of say one atmosphere, is unbalanced and outputs a first voltage signal to the electronics module 22 over lines 27 and 28. The electronics module 22 comprises an assembly 29 of three printed circuit boards (PCB) 30, 31, 32, and a mechanical interface 33 which will hereinafter be described in more detail. The bridge output voltage signal is converted by the electronics module to digital form before being checked and corrected for linearity and temperature effects. The corrected value which is a real time value is then converted to binary form and passed as frequency-shift key (FSK) signals by way of the mechanical interface 33, a pair of twisted flying leads 34 and a connector 35 to a rotary transformer 36 mounted in the wheel hub (not shown). The rotary transformer 36 comprises a primary coil 37 mounted on a fixed part of the vehicle, such as an axle (not shown), and secondary coil 38 mounted on a rotary component of the wheel, such as a wheel hub rim (not shown). A power signal output by a data receiving station on-board the aircraft, such as an on-board computer (not shown), is transmitted to the electronics module 22 by way of the primary and secondary coils of the rotary transformer and is rectified and regulated by the PCB 33 as will hereinafter be described to produce the voltage reference signal which is used to energise the pressure cell and the PCBs 30 and 31. The FSK signals are modulated onto the power signal and thereby transmitted from the secondary coil to the primary coil and passed from the primary coil to the on-board computer. The computer sequentially scans the pressure sensor 20 of each wheel of the undercarriage and analyses the FSK signals received back from each sensor to generate pressure and, if transmitted, temperature data and warnings which are made available to an aircraft central maintenance computer via an aircraft data bus (not shown).

Thus, a system in accordance with this embodiment of the present invention uses a pressure cell which will operate over the required temperature range (−55° C. to +160° C.) to measure pressure values over the required pressure range (0 to 254 psi) with the required accuracy and transmits real time pressure values to the aircraft on-board computer whether the wheel is rotating or stationary. The system corrects the pressure cell output for both linearity and temperature effect and introduces only one conversion inaccuracy which is that of converting the corrected pressure value to digital form for transmission back to the aircraft on-board computer. This compares with at least two inaccuracies introduced by systems that transmit data in analog form for conversion to digital form at the on-board computer. These inaccuracies are, for example, converting the pressure value to frequency and converting the frequency to digital form at the computer. An additional advantage of transmitting the data to the computer in digital form is that interference problems are reduced so that the system is more secure, in particular, standard error correction techniques can be used to overcome noisy channel conditions.

The main components of the system will now be described in greater detail commencing with the electronics module 22 and pressure cell 21.

Figure 2:
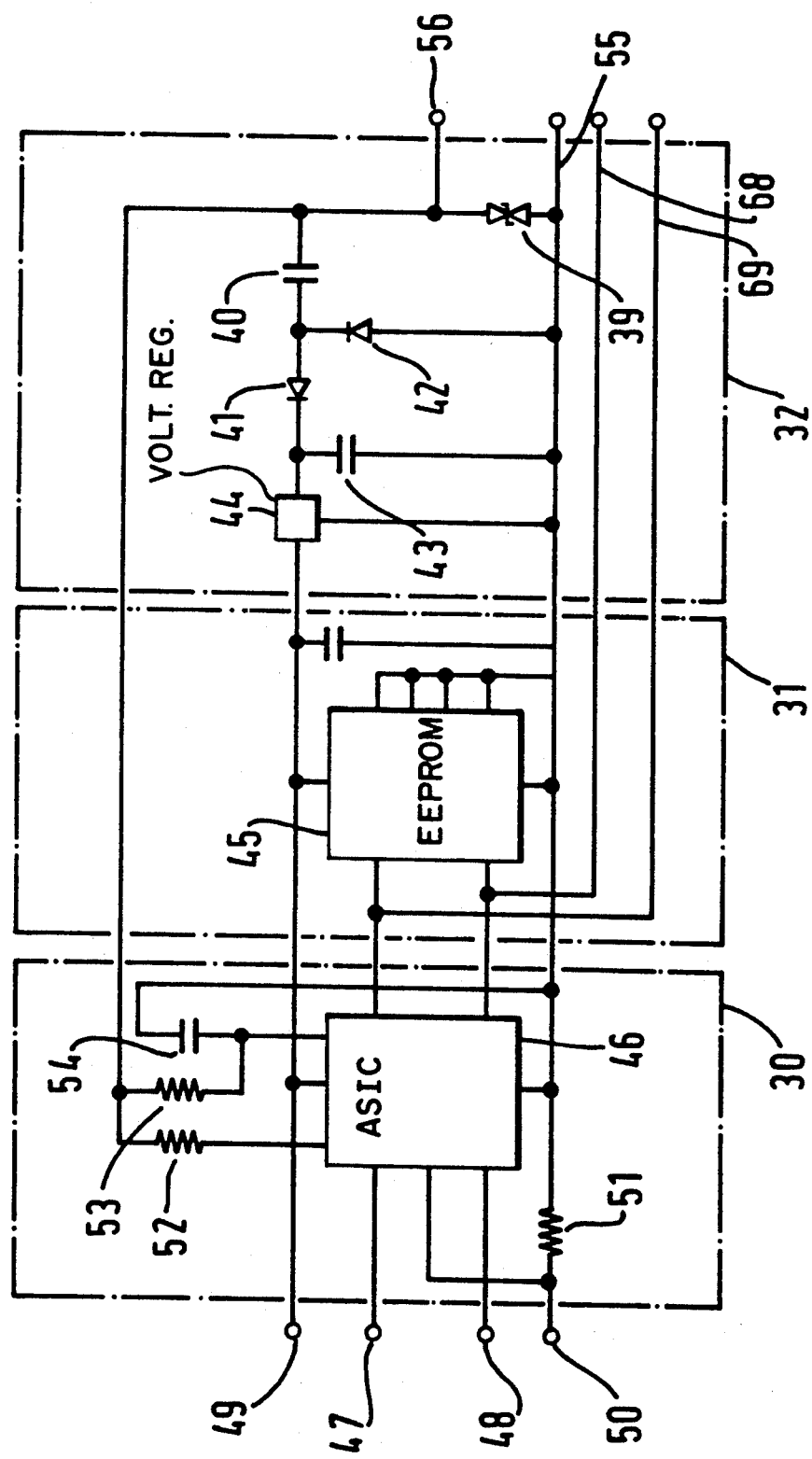
FIG. 2 is a circuit diagram of an electronics module provided as part of the system shown in FIG. 1.

Referring to the circuit diagram of the electronics module 22 shown in FIG. 2, the module 22 comprises three PCBs 30, 31, 32, of which PCB 32 is a power supply PCB; PCB 31 is an electrically-erasable-programmable-read-only memory (EEPROM) PCB; and PCB 30 is an application specific integrated circuit (ASIC) PCB. The module 22 receives a 31.25 kHz a.c. power signal output by the aircraft on-board computer and transmitted by the rotary transformer 36. The power input to the module 22 is protected by a bidirectional zener diode 39 and reaches the input via a capacitor 40 which offers a high impedance to the FSK signal and a low impedance to the power signal. The power signal is rectified by two diodes 41, 42 and a capacitor 43 and then converted to 5 volts d.c. by a voltage regulator 44. This voltage is used to energise the pressure cell 21 and to power the ASIC and EEPROM PCBs 30, 31, respectively.

The PCB 31 carries an EEPROM 45 which holds a 32×16 matrix look-up table that as will hereinafter be described is used to store temperature and pressure data for correcting signals output by the pressure cell 21.

The PCB 30 carries an application specific integrated circuit (ASIC) 46 which receives varying voltage signals (first signals) output by the pressure cell 21 over lines 27, 28 that are connected with the PCB 30 by pin connections 47, 48. The PCB 30 is provided with pins 49, 50 for connecting with the bridge input lines 25, 26, respectively, whereby the bridge is energised with the 5 volts signal. The PCB 30 further carries resistors 51, 52, 53 and capacitor 54. The output of the cell 21 is non-linear and also varies with temperature change which affects the overall resistance of the bridge 23. The overall resistance of the bridge is monitored by measuring the voltage across the resistor 51 which is a high precision resistor that is substantially unaffected by temperature. The voltage across the resistor 51 is obtained by the ASIC 46 and, using the known characteristics of the resistor, the current flow through the resistor is calculated. Changes in current flow through the resistor are a measure of variations in the overall resistance of the bridge due to temperature change and, hence temperature related signals (second signals) are obtained for correction purposes.

The resistor 52 is a current limiting resistor which uses the power signal to provide a clock for the ASIC 46. The resistor 53 is used to modulate FSK signals carrying data output by the ASIC onto the power signal. In order not to lose most of the FSK signal, the value of the resistor 53 is not high enough to protect the output to the rotary transformer over pin 55 of a pair of pins 55, 56, from the high voltages of the power signal, therefore capacitor 54 is necessary to act as a filter to reduce the power signal level on pin 55.

Figure 3:
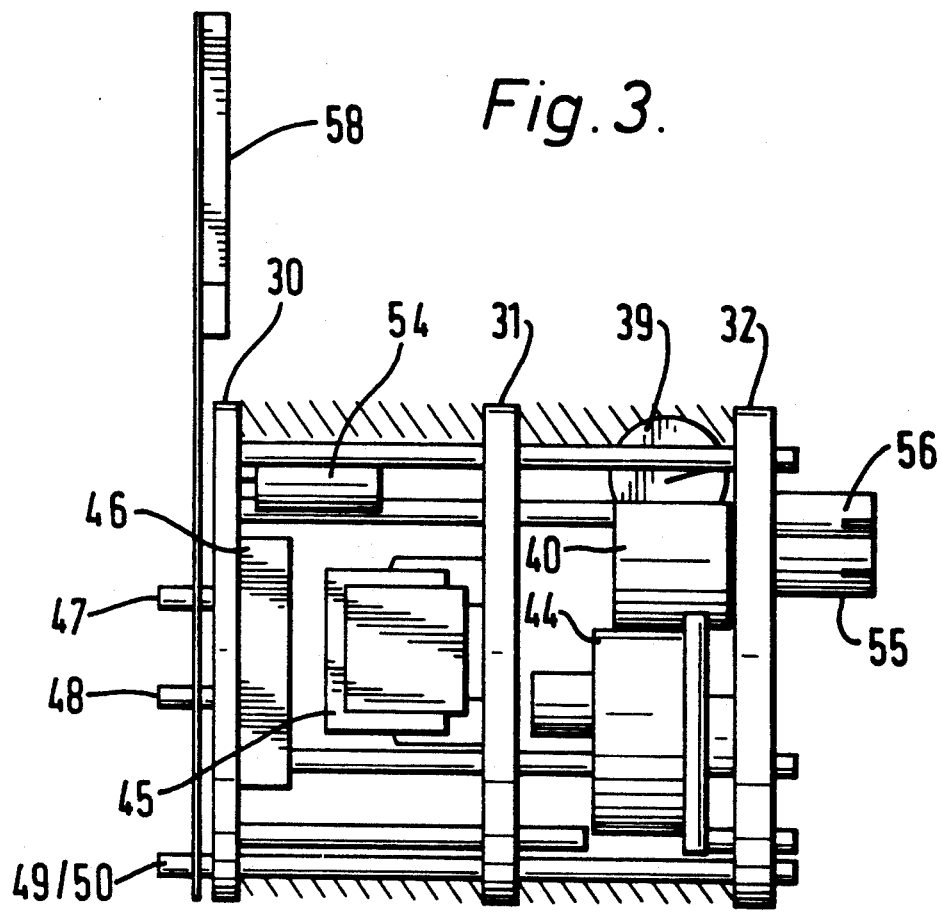
FIG. 3 is a schematic side elevation illustrating the mechanical construction of the electronics module shown in circuit form in FIG. 2.

The mechanical configuration of the electronics module 22 is shown in FIGS. 3 and 4. The PCBs 30, 31, 32 are circular in shape and are connected together by copper wires 57, soldered to each PCB. The wires position the PCBs relative to one another and allow signals to pass between them. The ASIC 46 is a surface mount ceramic component and the PCB 30 is of ceramic construction to prevent problems arising from differential expansion between the ASIC 46 and the PCB 30. PCBs 31 and 32 carry conventional components with through hole pins and are therefore constructed of polyimide. The whole assembly is potted with a suitable potting compound having low weight and low coefficient of thermal expansion. The exterior surface of the ceramic PCB 30 carries no tracks but is provided with pads for connection of the copper wires 57, and is also provided with the pins 47, 48, 49, 50 for connection to the pressure cell 21. This latter connection is made by means of a single layer polyimide circuit 58.

Figure 5:
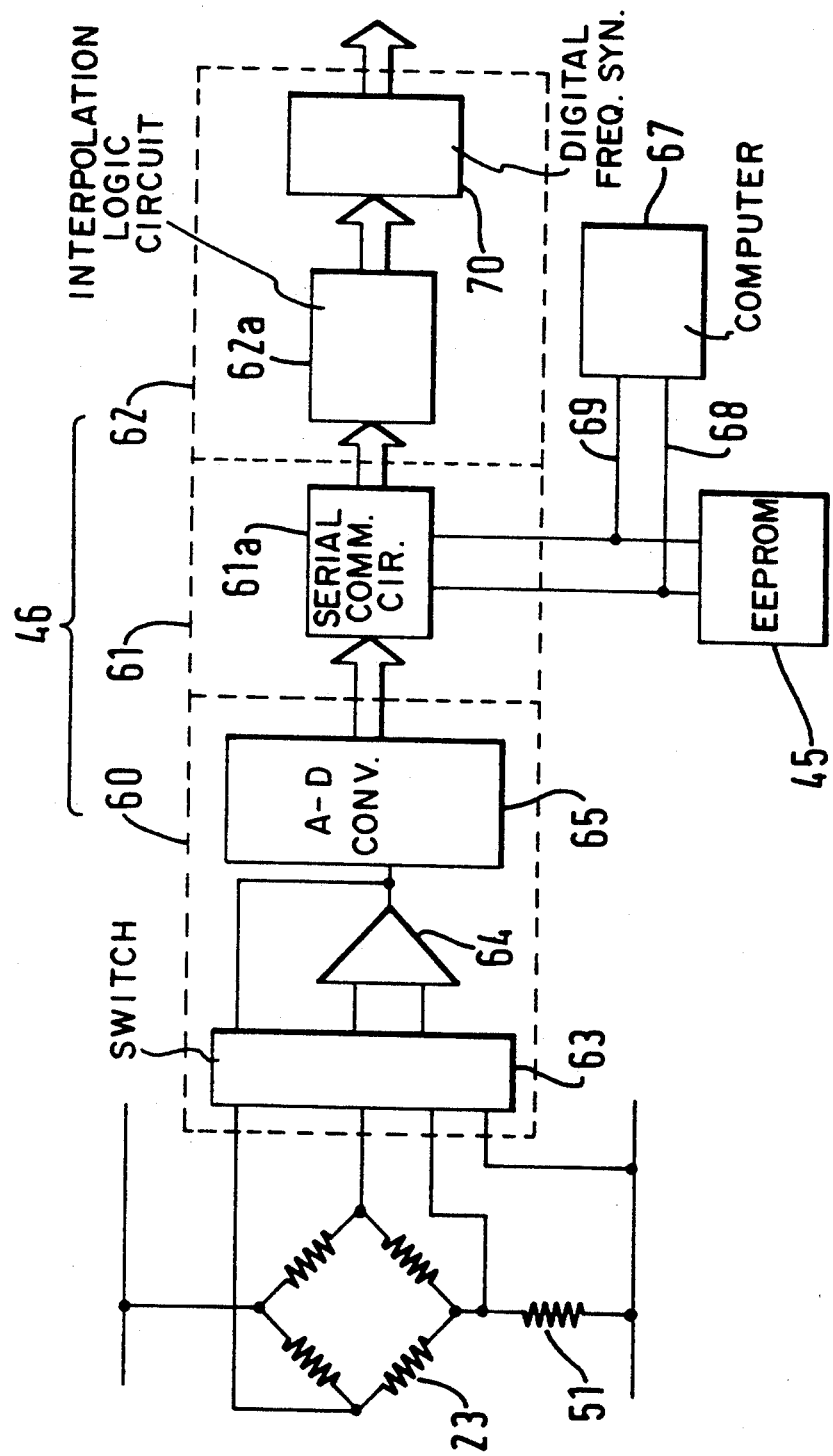
FIG. 5 is a diagrammatic representation of an application specific integrated circuit provided with one of the printed circuit boards.

As shown in FIG. 5, the ASIC 46 comprises three stages, an analog to digital conversion stage 60, a serial communications stage 61 and an interpolation logic stage 62. The first stage 60 consists of a switch 63, a programmable gain amplifier 64 and an analogue to digital converter 65. The first stage 60 receives two inputs, the first input being the output of the pressure cell bridge 23 which is proportional to pressure and temperature; and the second input being supplied from the temperature sensing resistor 51 which is a high stability component, this second input being proportional to variation in temperature, but relatively insensitive to the variation of pressure. The input to the amplifier 64 is toggled by the switch 63 between the input from the bridge 23 and the input from the resistor 51 at the clock frequency and the gain of the amplifier 64 is adjusted accordingly. Each time a pair of readings are taken the polarity of the amplifier 64 and the analog to digital converter 65 are reversed in order to cancel any errors caused by offset voltages. The analog to digital converter provides two digital words, one describing the temperature and the other the pressure to which the cell 21 is subjected. These words are passed to a serial communications circuit 61a of the serial communications stage 61 which passes the most significant bits of the two words to the EEPROM 45 as addresses to enable stored correction data to be retrieved. Each individual correction data word is stored in the EEPROM 45 as an eight bit byte and its inverse to allow data integrity checks to be performed on the data obtained from the EEPROM. The data obtained from the EEPROM consists of four eight bit bytes and their inverse. These are checked and are passed to an interpolation logic circuit 62a of the interpolation logic stage 62, together with the least significant bits of the two digital words derived from the analog to digital converter 65. These latter are used together with the data from the EEPROM to calculate the true corrected pressure in the tire. The corrected pressure data is modulated onto the 31.25 kHz power signal using frequency-shift key techniques and a digital frequency synthesiser 70 incorporated as a part of the third stage 62 of the ASIC 46.

Figure 6:
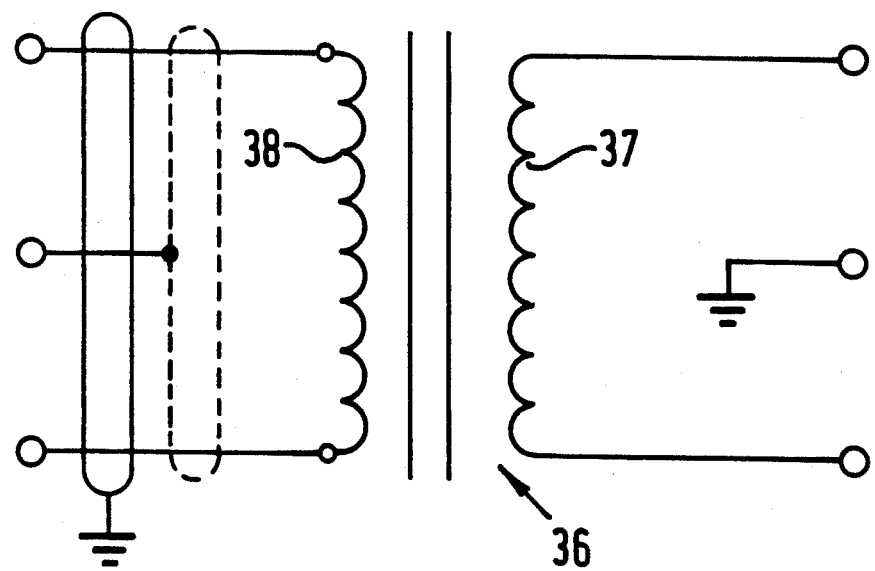
FIG. 6 is a circuit diagram of a rotary transformer provided as part of the system shown in FIG. 1.

Referring now to FIG. 6, the rotary transformer 36 comprises two air coupled screened windings of 0.132 mm diameter copper wire insulated with polyimide. The primary (stator) winding 38 has 190 turns and the secondary (rotor) winding 37 has 115 turns. The transformer allows the power signal output by the aircraft on-board computer to be transferred from the on-board computer to the pressure sensor 20 on the wheel (not shown) and the FSK signal to be transmitted back from the pressure sensor to the on-board computer. The mechanical function of the transformer is to locate the primary and secondary windings relative to one another to ensure the effective transfer of power at 31.25 kHz and FSK signals between the rotating part and the fixed part of the vehicle.

After assembly of the pressure cell 21 and the electronic module 22, pressure sensor 20 is calibrated over the operating temperature range −55° C. to +160° C. and the operating pressure range 0 to 254 psi. Two voltage output signals are derived, one $V_p$ being proportional to pressure but being influenced by temperature, and the other $V_t$ being proportional to temperature but not being substantially influenced by pressure. In order to avoid storing a large number of values which would normally be necessary to achieve the required accuracy a curve fitting method is used to define the values to be written into the matrix look-up table in the EEPROM 45 using a portable computer 67 (FIG. 5) which is connected by a serial data line 68 and a serial clock line 69 to the EEPROM 45.

In operation, with aircraft power switched on, the aircraft on-board computer outputs a 31.25 kHz power signal sequentially to the primary coil 38 of the rotary transformer 36 associated with each undercarriage wheel. The power signal is applied to each wheel for 300 milliseconds (ms) of which the first 150 ms is a data acquisition and processing period and the second 150 ms is a data transmission period. The power signal is transmitted to the secondary coil 37 and enters the power supply PCB 32 which processes the power signal and outputs a 5 volts d.c. signal. This voltage is used to energise the pressure cell 21 and power the EEPROM and ASIC PCBs 31 and 32, respectively.

The ASIC 46 reads four memory locations in the EEPROM 45 to bring down pressure and temperature gain values for the input amplifier. The gain values plus their inverse values are read to validate EEPROM operation. (Prior to calibration default values are loaded into the EEPROM). The gain is then adjusted to give full range of the analog to digital converter and the gain values are reloaded into the EEPROM.

The ASIC 46 next reads the differential pressure and single-ended input temperature values for a minimum of 100 samples. The polarity of inputs are reversed on alternate clock cycles in order to average out sensor and amplifier offsets. The analog to digital converter feeds the averaging logic which outputs 1 byte of data each for temperature and pressure. These are then truncated into a 9 bit address (5 bits for temperature and 4 bits for pressure).

The 9 bit word is used to address eight locations in the EEPROM. The 8 locations are derived by incrementing the temperature portion by one bit and then the pressure portion to give a sequence of four points. This is repeated for the four inverse data locations. The data and inverse data is checked for corruption and four map points are derived. If corruption is detected, an error word is passed to the FSK output and no other processing is performed. If the data is good, the ASIC then uses the least significant bit information for pressure and temperature to carry out a linear interpolation to calculate a true pressure value.

The corrected or true pressure value and, if required, the temperature value, are coded in four binary words for transmission to the aircraft on-board computer. The four binary words W1, W2, W3 and W4 have the same structure which is as follows:
1 start bit (logic 0)
8 data bits, with most significant bit first
1 parity bit, (data bits + parity = even)
1 stop bit (logic 1)

The words W1, W2 and W3 are identical and have a value which represents the pressure inside the tire.

If the system is required to transmit temperature data, word W4 has a value which represents the temperature. Otherwise, word W4 is coded to give a 'not equipped' code.

Converting corrected pressure values and, if desired, temperature values to binary coded data for transmission to the vehicle further enhances the accuracy of the system because the data is in a form suitable for use on the vehicle without requirement for conversion from analog to digital form. Also, the chances of signal corruption during transmission of the data are further reduced.

The ASIC incorporates built in tests (BITE) which check the pressure cell inputs are not short circuited to 5 V, low impedance to 0 V, and open circuit. The BITE also tests the EEPROM and the ASIC itself. If an error is detected this is reported by an error code in the words W1, W2 and W3. The ASIC also checks that the tire pressure is within a required range, in this embodiment 0 to 254 psi. The ASIC does not report an error for any pressure above 254 psi, instead any higher pressure is limited to a 254 reading.

Examples of the data bits for words W1, W2 and W3 in the pressure range are as follows:

| Pressure psi | Decimal | Binary |
| --- | --- | --- |
| 0 | 0 | 0000 0000 |
| 1 | 1 | 0000 0001 |
| 2 | 2 | 0000 0010 |
| 253 | 253 | 1111 1101 |
| 254 and above | 254 | 1111 1110 |

The error code 1111 1111 is sent when the ASIC BITE detects:
a. The failure of the EEPROM test
b. A failure of the pressure cell
c. The failure of the ASIC self test.

The word 4 'not equipped' code is 1111 1111.

The word data is passed to the digital frequency synthesiser 70 which generates one of two frequencies. A frequency of 2225 Hz is generated for logic 1 and a frequency of 2025 Hz is generated for logic 0. These frequencies are modulated onto the 31.25 kHz power signal and transmitted to the aircraft on-board computer where the data is decoded and made continuously available to the aircraft data bus together with any warning flags.

What is claimed is:

1. A method of measuring vehicle wheel tire inflation pressure in real time comprising the steps of:
   exposing a pressure cell to pressure of gas inflating the wheel tire;
   transmitting a power signal from the vehicle to the wheel;
   conditioning the power signal to obtain a signal suitable for energising the pressure cell;
   energising the pressure cell;
   sensing inflation pressure using the pressure cell;
   outputting a first signal from the pressure cell representative of tire inflation pressure acting on the pressure cell;
   monitoring the resistance of the pressure cell to obtain a second signal representative of the temperature of the pressure cell;
   converting the first and second signals to digital signals;
   applying the digital signals to address locations in a look-up table holding calibrated pressure cell outputs over a range of pressure and temperature;
   processing data from the look-up table to obtain a corrected real time pressure value; and
   transmitting a signal representative of the corrected real time pressure value to the vehicle.

2. A method as claimed in claim 1, wherein the step of monitoring the pressure cell resistance comprises measuring the current flow through a high precision resistor connected in series in an input line to the pressure cell.

3. A method as claimed in claim 1, further comprising the step of converting corrected pressure values to binary coded data for transmission to the vehicle.

4. A method as claimed in claim 3, wherein the pressure value is transmitted repetitively in three binary words, each word comprising a start bit, a number of data bits, a parity bit and a stop bit.

5. A method as claimed in claim 3, wherein four binary words are transmitted, the first three binary words comprising pressure data and the fourth word comprising temperature data.

6. A method as claimed in claim 3, wherein the binary coded data is transmitted by modulating frequency-shift key signals onto the power signal.

7. A system for real time measurement of vehicle wheel tire inflation pressure, having a pressure sensor to be mounted on a rotary part of a vehicle wheel whose inflation pressure is to be measured, said pressure sensor comprising:
   a pressure cell for generating first signals representative of the inflation pressure in said vehicle wheel; and
   an electronic module, connected to said pressure cell, including
      a signal conditioning electrical circuit for conditioning a power signal transmitted to said rotary wheel part and outputting a signal for energising said pressure cell,
      an electrically-erasable-programmable-read-only memory (EEPROM) for storing, in the form of a look-up table, values of pressure and temperature signals output by said pressure cell when calibrated over a range of pressure and temperature,
      means for monitoring the resistance of said pressure cell and outputting second signals representative of the temperature of said pressure cell, and
      a pressure cell signal output processing electrical circuit receiving said first signals from said pressure cell and said second signals from said monitoring means, said processing electrical circuit including means for converting said first and second signals to digital signals, means for addressing locations in said EEPROM look-up table, means for processing data from said look-up table to obtain a corrected real time pressure value, and means for converting the corrected real time pressure value to binary data for transmission to the vehicle.

8. A system as claimed in claim 7, wherein means for transmitting the power signal onto the rotary wheel part comprise rotary transformer means having a primary coil mounted on a fixed part of the vehicle and a secondary coil mounted on the rotary wheel part.

9. A system as claimed in claim 7, wherein said electronic module comprises three electrically connected printed circuit boards (PCB) including a power supply PCB having connection means for receiving the power signal, an EEPROM PCB, and a pressure cell signal output processing PCB including means for connecting to said pressure cell.

10. A system as claimed in claim 9, wherein the power supply PCB comprises power signal rectification means and voltage regulator means for converting a rectified power signal to a voltage reference signal which is used to energise the pressure cell means and to power the EEPROM PCB and the pressure cell signal output processing PCB.

11. A system as claimed in claim 9, wherein the pressure cell signal output processing PCB mounts an application specific integrated circuit (ASIC).

12. A system as claimed in claim 11, wherein the ASIC reads pressure and temperature voltage signal values for a plurality of samples.

13. A system as claimed in claim 12, wherein the ASIC includes an analog to digital converter for changing the analog pressure and temperature voltage signals to digital signals.

14. A system as claimed in claim 13, wherein the ASIC includes averaging logic means which receives digital signals from said analog to digital converter and outputs EEPROM addresses for both pressure and temperature values.

15. A system as claimed in claim 14, wherein the ASIC further includes interpolation logic means for processing data acquired from the EEPROM and calculating a corrected pressure value.

16. A system as claimed in claim 15, wherein the ASIC further includes digital synthesiser means for converting a binary coded form of the corrected pressure value to frequency-shift key (FSK) signals which are modulated onto the power signal for transmission back to the vehicle.

17. A system as claimed in claim 12, wherein the ASIC incorporates built in test (BITE) for checking the inputs of the pressure cell are not short circuited to energising voltage, low impedance to 0 volts, and open circuit.

18. A system as claimed in claim 17, wherein the BITE is adapted for testing the EEPROM PCB and ASIC PCB and if an error is detected to report this by an error code.

19. A system as claimed in claim 7, wherein the pressure cell comprises a piezoresistive element.

* * * * *